(12) United States Patent
Yanase et al.

(10) Patent No.: US 7,873,155 B2
(45) Date of Patent: Jan. 18, 2011

(54) METHOD AND DEVICE FOR ESTIMATING WORK SKILLS, AND COMPUTER PRODUCT

(75) Inventors: Takashi Yanase, Kawasaki (JP); Hideki Yamanaka, Kawasaki (JP); Isao Namba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1280 days.

(21) Appl. No.: 10/891,175

(22) Filed: Jul. 14, 2004

(65) Prior Publication Data

US 2005/0201546 A1   Sep. 15, 2005

(30) Foreign Application Priority Data

Mar. 9, 2004 (JP) ............................. 2004-065645

(51) Int. Cl.
*H04M 3/00* (2006.01)
(52) U.S. Cl. ...................... 379/265.05; 379/309; 705/11
(58) Field of Classification Search . 379/265.01–266.1, 379/215.01, 309; 705/11
See application file for complete search history.

(56) References Cited

U.S. PATENT DOCUMENTS

| | | | | |
|---|---|---|---|---|
| 5,825,869 A | * | 10/1998 | Brooks et al. | 379/265.12 |
| 6,163,607 A | * | 12/2000 | Bogart et al. | 379/266.01 |
| 6,424,709 B1 | * | 7/2002 | Doyle et al. | 379/265.02 |
| 6,453,038 B1 | * | 9/2002 | McFarlane et al. | 379/265.05 |
| 6,459,787 B2 | * | 10/2002 | McIllwaine et al. | 379/265.06 |
| 6,648,760 B1 | * | 11/2003 | Nicastro | 463/23 |
| 6,690,788 B1 | * | 2/2004 | Bauer et al. | 379/242 |
| 6,700,971 B1 | * | 3/2004 | Cohen et al. | 379/265.06 |
| 2003/0046142 A1 | * | 3/2003 | Eitel et al. | 705/11 |

FOREIGN PATENT DOCUMENTS

| | | |
|---|---|---|
| JP | 2000-253149 | 9/2000 |
| JP | 2001-331624 A | 11/2001 |
| JP | 2002-042293 A | 2/2002 |
| JP | 2002-261912 A | 9/2002 |
| JP | 2002-366790 A | 12/2002 |

OTHER PUBLICATIONS

Japanese Office Action dated Jan. 6, 2009 for Japanese Application No. 2004-065645. (A partial English-language translation is provided.).

* cited by examiner

*Primary Examiner*—Md S Elahee
(74) *Attorney, Agent, or Firm*—Fujitsu Patent Center

(57) ABSTRACT

In a work skill estimating device, an item information receiving unit receives, as item information, duration information of each dealing sequence in a customer call. A dealing duration estimating unit estimates a dealing duration of an item based on the item information received. A work skill estimating unit estimates an operator's work skill based on the dealing duration estimated. A skill map creating unit creates a skill map to comprehend the operator's work skill estimated.

4 Claims, 19 Drawing Sheets

FIG.3

| | 12a |
|---|---|
| ITEM ID | 200401190001 |
| OPERATOR ID | OP00001 |
| CUSTOMER ID | CL12345 |
| COMMUNICATION START TIME | 2004/01/19 09:15:00 |
| COMMUNICATION END TIME | 2004/01/19 09:30:00 |
| ITEM PROCESSING START TIME | 2004/01/19 09:16:30 |
| ITEM PROCESSING END TIME | 2004/01/19 09:35:20 |
| ITEM CATEGORY | SOLVING INTERNET TROUBLE |
| INQUIRY CONTENTS | CANNOT CONNECT TO THE INTERNET |
| RESPONSE CONTENTS | CHECK SETTING OF MODEM |
| SIMULTANEOUSLY PROCESSING ITEM ID | 200401190002 |

FIG.5

| ITEM ID | OPERATOR ID | ITEM CATEGORY | NUMBER OF SIMULTANEOUSLY PROCESSING ITEMS | SUBSTANTIAL DEALING DURATION | CALL DURATION | ITEM PROCESSING DURATION | ESTIMATED DEALING DURATION |
|---|---|---|---|---|---|---|---|
| 200401190001 | OP00001 | SOLVING OF INTERNET TROUBLE | 1 | 00:20:20 | 00:15:00 | 00:18:50 | 00:33:15 |
| 200401190002 | OP00001 | UPDATING OF MEMBER INFORMATION | 1 | 00:31:40 | 00:15:00 | 00:10:40 | 00:21:00 |
| 200401190003 | OP00002 | RESPONSE TO QUESTION ABOUT SOFTWARE | 0 | 00:17:30 | 00:10:30 | 00:12:30 | 00:17:30 |

| WORK TASK | NUMBER OF ITEMS | ESTIMATED DEALING DURATION AVERAGE |
|---|---|---|
| SOLVING OF INTERNET TROUBLE | 13384 | 30:40 |
| RESPONSE TO QUESTION ABOUT THE INTERNET | 4080 | 23:08 |
| SOLVING OF SOFTWARE TROUBLE | 5592 | 27:12 |
| RESPONSE TO QUESTION ABOUT SOFTWARE | 8507 | 20:36 |
| SOLVING OF HARDWARE TROUBLE | 10580 | 29:12 |
| RESPONSE TO QUESTION ABOUT HARDWARE | 4563 | 22:46 |
| UPDATING OF MEMBER INFORMATION | 4735 | 19:53 |

| OPERATOR ID | BASE | AVERAGE SKILL VALUE | SKILL VALUE OF EACH WORK TASK | | | | | |
|---|---|---|---|---|---|---|---|---|
| | | | SOLVING OF INTERNET TROUBLE | RESPONSE TO QUESTION ABOUT THE INTERNET | SOLVING OF SOFTWARE TROUBLE | RESPONSE TO QUESTION ABOUT SOFTWARE | SOLVING OF HARDWARE TROUBLE | RESPONSE TO QUESTION ABOUT HARDWARE | UPDATING OF MEMBER INFORMATION |
| OP00001 | TOKYO | 72.1 | 55 | 67 | 80 | 85 | 60 | 68 | 90 |
| OP00002 | TOKYO | 101.4 | 90 | 106 | 102 | 110 | 98 | 104 | 100 |
| OP00003 | OSAKA | 162.3 | 180 | 143 | 201 | 153 | 175 | 154 | 130 |

METHOD AND DEVICE FOR ESTIMATING WORK SKILLS, AND COMPUTER PRODUCT

BACKGROUND OF THE INVENTION

1) Field of the Invention

The present invention relates to a method and device for estimating work skills, and a computer product that manage work skills of operators accurately and exhaustively.

2) Description of the Related Art

Conventionally, to manage a call center efficiently, tasks such as complaints and inquiries from customers are distributed among operators based on skills of the operators.

For example, in a call transfer destination automatic selecting system disclosed in Japanese Patent Application Laid-Open No. 2000-253149, if there is a plurality of operators dealing with the same kind of items in past dealing tasks, the following process is executed to select an operator to whom an inquiry call should be transferred. When the similar kind of questions are addressed again, the call is transferred to that operator whose dealing duration is the shortest, using information about keywords of question contents recorded in dealing history information and an average of the dealing duration.

To distribute the dealing tasks such as complaints and inquiries from customers based on the skills of individual operators, and from a viewpoint that operators be trained efficiently, an administrator in a call center must know detailed skills of individual operators. Therefore, the administrator in the call center conducts an examination for evaluating the processing duration and dealing accuracy of items to determine the skills of the operators.

However, in the conventional system, understanding the work skills depends on individual abilities of the administrators. Therefore, it is difficult to manage the work skills of the operators exhaustively. Particularly in large-scale call centers, where the number of operators is large and the necessary work knowledge is comprehensive, it is virtually impossible to manage the work skills of the operators exhaustively by people.

In the conventional system, it is difficult to estimate the work skills of operators accurately. That is, when an operator deals with a plurality of items (questions and troubles) in one telephone call from a customer, the administrator cannot clearly know how long the operator dealt with individual items within the call duration recorded. Therefore, the dealing duration of the individual items cannot be obtained accurately, and the work skills of the operator cannot be estimated accurately.

Even when an operator deals with one item (question and trouble) in one customer call, item processing start time and end time on a record may not always match with actually written work duration. Therefore, the dealing duration required for one item cannot be obtained accurately, and thus, the work skills of the operator cannot be estimated accurately. Specifically, work done by an operator in one dealing with a customer includes writing of dealt contents besides talking with the customer, and this writing work can be done for a plurality of items after the call ends, or the writing work can be done during a break or while other work is being done. That is, the writing work can be done freely when the operator is not busy. Therefore, the item processing start time and end time on the record do not mach with the work duration actually written. Therefore, it is difficult to obtain item processing duration accurately.

SUMMARY OF THE INVENTION

It is an object of the invention to at least solve the problems in the conventional technology.

A work skill estimating device according to an aspect of the present invention includes an item information receiving unit that receives, as item information, duration information of each dealing sequence in a customer call; a dealing duration estimating unit that estimates a dealing duration of an item based on the item information received; a work skill estimating unit that estimates an operator's work skill based on the dealing duration estimated; and a skill map creating unit that creates a skill map to comprehend the operator's work skill estimated.

A method for estimating work skill of operators according to another aspect of the present invention includes receiving duration information, as item information, of each dealing sequence in a customer call; estimating a dealing duration of an item based on the item information received; estimating an operator's work skill based on the dealing duration estimated; and creating a skill map to comprehend the operator's work skill estimated.

A computer program according to still another aspect of the present invention realizes the above method on a computer.

A computer-readable recording medium according to still another aspect of the present invention stores therein the above computer program.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 illustrates an example of information to be stored in an item information database;

FIG. 5 is an example of information to be stored in a dealing duration database;

FIG. 6 is an example of information to be stored in a work task database;

FIG. 7 is an example of information to be stored in a work skill database;

DETAILED DESCRIPTION

Exemplary embodiments of a method and device for estimating work skills, and a computer product will be explained with reference to the accompanying drawings. A work skill estimating device (work skill estimating method) according to a first embodiment, a computer system according to a second embodiment that executes the work skill estimating program, and various modified examples as a third embodiment are explained below in that order.

In a first embodiment of the present invention, an example that the work skill estimating device of the present invention is applied to a personal computer (PC) support center is explained. A constitution of a work skill estimating system according to the first embodiment and procedures of various processes are explained at the same time.

Figure 1:
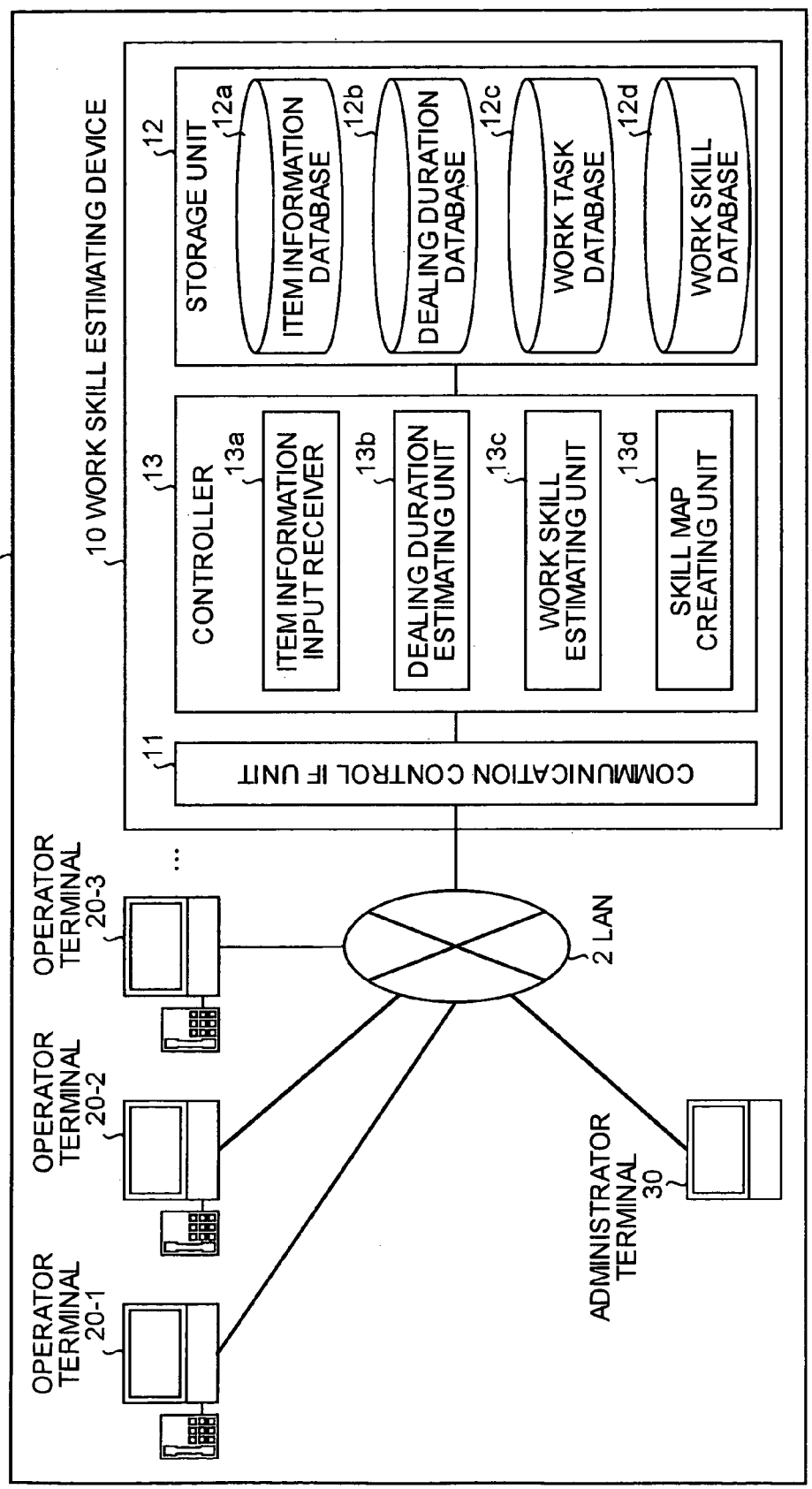
FIG. 1 illustrates a constitution of a work skill estimating system according to a first embodiment of the present invention.

FIG. 1 illustrates a constitution of the work skill estimating system according to the first embodiment. Operator terminals 20-1, 20-2, and 20-3 (hereinafter, "operator terminals 20"), an administrator terminal 30, and a work skill estimating device 10 are connected with one another via a local area network (LAN) (corporate network) 2.

The operator terminals 20 are connected with a communication device such as a telephone set, an Internet Protocol (IP) telephone terminal, which receives tasks for dealing with customers such as complaints and inquiries via a public telephone line network or an IP network (not shown). Specifically, the operator terminals 20 transmit duration information and item contents of dealing with customers to the work skill estimating device 10 via the LAN 2.

An administrator who manages operators' tasks uses the administrator terminal 30. Specifically, the administrator terminal 30 acquires estimated results of work skills of operators from the work skill estimating device 10. The work skills become an indicator when dealing tasks such as complaints and inquiries from customers are distributed and operators are trained.

The work skill estimating device 10 receives the duration information and contents of the dealing with customers as item information, and estimates operators' skills in the tasks based on the item information received. The work skill estimating device 10 includes a communication control interface (IF) unit 11, a storage unit 12, and a controller 13 that control communication of various information between the operator terminals 20 and the administrator terminal 30.

The storage unit 12 stores data and programs needed by the controller 13 for various processes. The storage unit 12 includes an item information database 12a, a dealing duration database 12b, a work task database 12c, and a work skill database 12d on a functionally conceptual basis.

Figure 2:
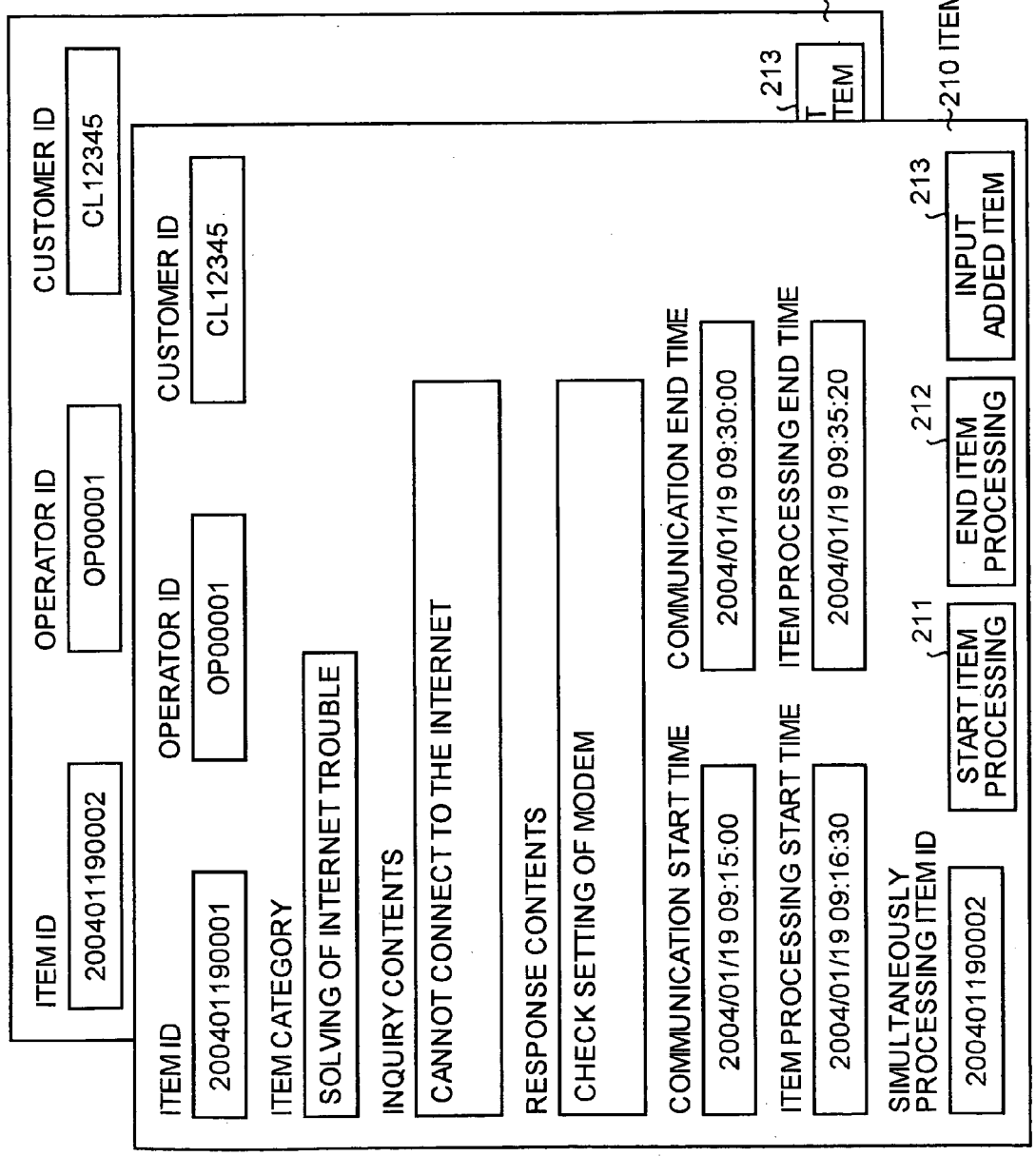
FIG. 2 illustrates one example of an item input screen presented to an operator.

The item information database 12a stores item information input into an item input screen (see FIG. 2) by an item information input receiver 13a. Specifically, as shown in FIG. 3, the item information database 12a includes the fields item ID, operator ID, customer ID, communication start time, communication end time, item processing start time, item processing end time, item category, inquiry contents, response contents, and simultaneously processing item ID.

Figure 4:
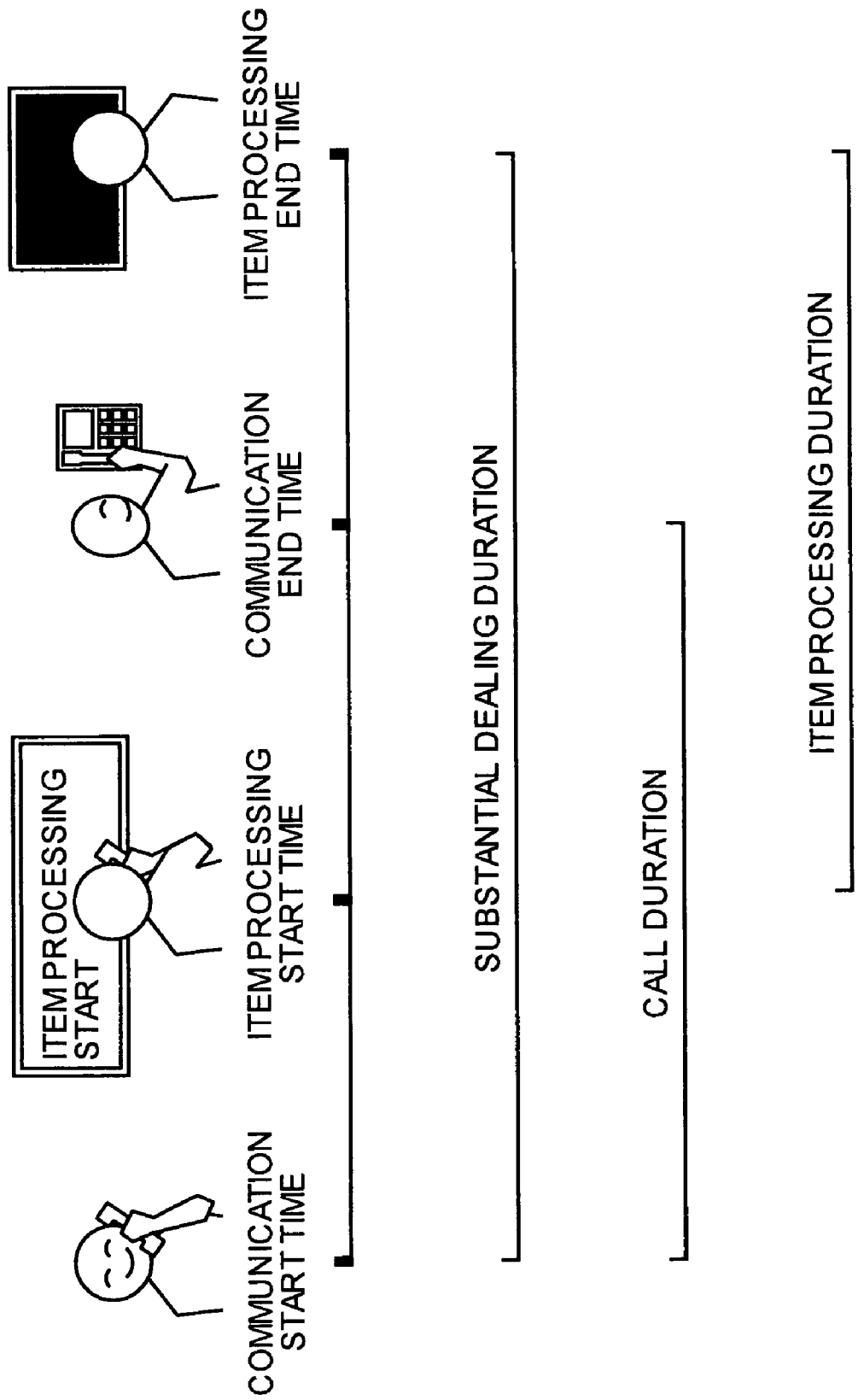
FIG. 4 illustrates a dealing sequence when dealing with a customer inquiry.

These fields are specifically explained below. The item ID is an identifier for identifying an item, the operator ID is an identifier for identifying an operator, and the customer ID is an identifier for identifying a customer. As shown in FIG. 4, the communication start time is time at which a communication with a customer who makes an inquiry starts, and the communication end time is time at which the communication with the customer ends. The item processing start time is time at which an operator starts executing an item process, and the item processing end time is time at which an operator ends the item process.

The item category is used for sorting items by work tasks, and includes, for example, solving of Internet trouble, response to question about the Internet, updating of member information, and the like. Contents of questions and troubles from customers are described in the inquiry contents, and contents of responses to customers' questions, contents of instructions for troubles given to customers, or contents of operators' tasks are described in the response contents. When plural items arise simultaneously in one call from a customer, IDs of the items are described in the simultaneously processing item ID. The item information in the item information database 12a corresponds to the item input screen shown in FIG. 2.

The dealing duration database 12b stores duration required for processing items and estimated dealing duration therein. Specifically, as shown in FIG. 5, the dealing duration database 12b includes the fields item ID, operator ID, item category, number of simultaneously processed items, substantial dealing duration, call duration, item processing duration, and estimated dealing duration.

These fields are explained below. The item ID, the operator ID, and the item category correspond to the item ID, the operator ID, and the item category in the item information database 12a. The number of simultaneously processed items is the number of other processed items at one call, and corresponds to the number of the item ID recorded in the simultaneously processed item ID in the item information database 12a.

The substantial dealing duration corresponds to a difference between the item processing end time and the communication start time in the item information database 12, as shown in FIG. 4. The call duration corresponds to a difference between the communication end time and the communication start time in the item information database 12a. The item processing duration corresponds to a difference between the item processing end time and the item processing start time in the item information database 12a. The estimated dealing duration is an estimate of the duration that may be required for processing one item including talking with a customer and the inputting of item contents.

The work task database 12c stores information about predetermined work tasks, and specifically, as shown in FIG. 6, includes the fields work task, number of items, and estimated dealing duration average.

These fields are explained specifically below. The work task is such that items are sorted by contents, and corresponds to the item category in the item information database 12a. In the example shown in FIG. 6, solving of Internet trouble, response to question about the Internet, solving of software trouble, response to question about software, solving of hardware trouble, response to question about hardware, and updating of member information are stored as examples of the work task. Further, the number of items is the number of items belonging to the work task. The estimated dealing duration average is an average of the estimated dealing duration in the items belonging to the work tasks.

The work skill database 12d stores information about operators' work skills, and specifically, as shown in FIG. 7, includes the fields operator ID, base, skill value of each work task, and average skill value.

These fields are explained specifically below. The operator ID is an identifier for identifying an operator, and corresponds to the operator ID in the item information database 12a and the dealing duration database 12b. If operators work from plurality of workplaces, the base indicates the location to which the operator belongs. The skill value of each work task is an operator's skill value of each work task, and each item of the skill value of each work task corresponds to each work task in the work task field in the work task database 12c. The average skill value is a general skill value of an operator, and corresponds to the average of the skill value of each work task.

The controller 13 has internal memories that store control programs such as operating system (OS), programs for defining various processing procedures, and necessary data, and the various processes are executed by the corresponding processing units. On a functionally conceptual basis, the controller 13 includes an item information input receiver 13a, a dealing duration estimating unit 13b, a work skill estimating unit 13c, and a skill map creating unit 13d, which are closely related with the present invention.

When a new item is generated, the item information input receiver 13a receives an acquiring request on the item input screen from an operator, transmits the item input screen to the operator terminals 20, and receives input of the item information.

Figure 8:
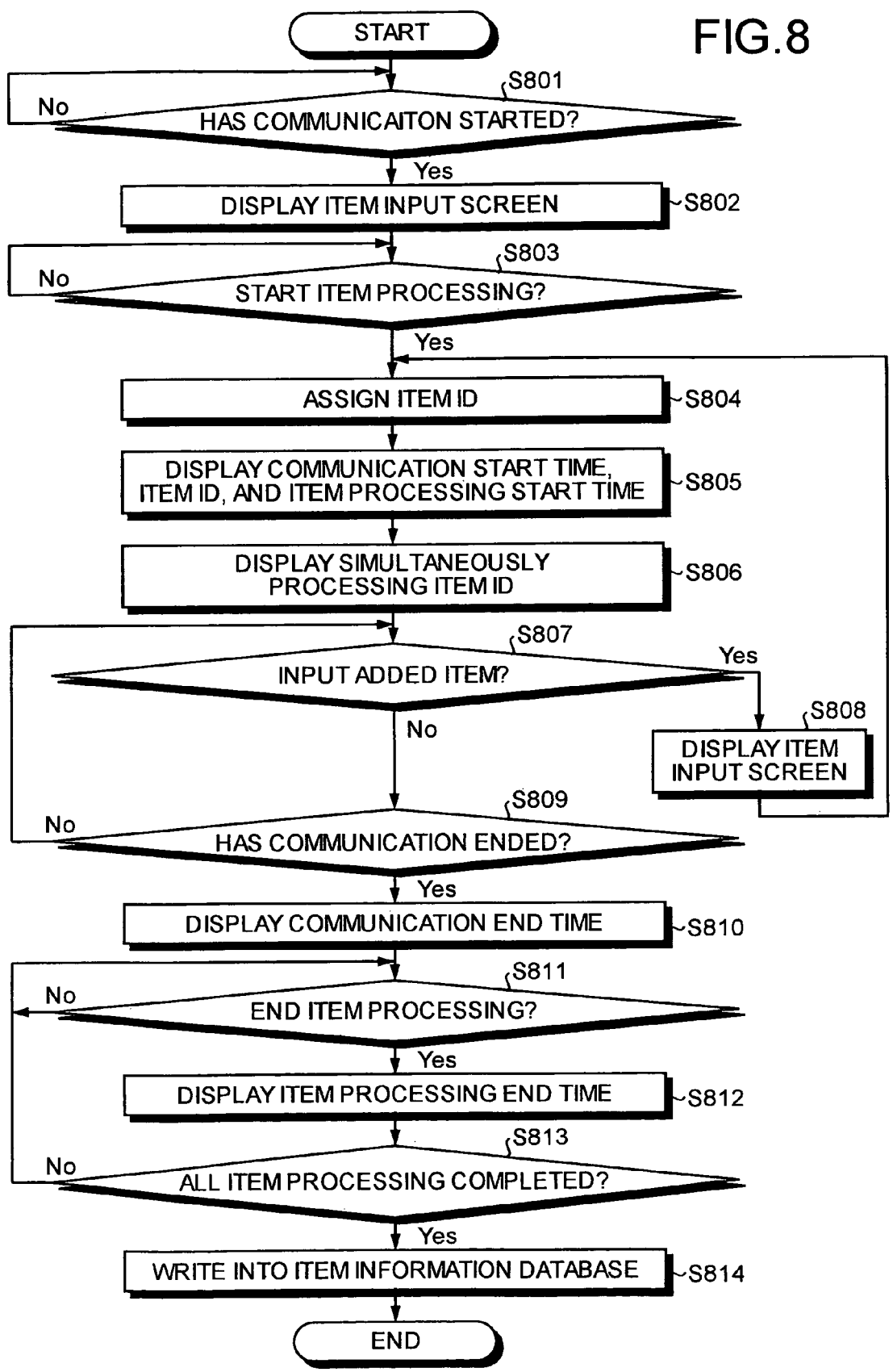
FIG. 8 is a flowchart of a process procedure executed by an item information input receiver.

FIG. 8 is a flowchart of the process procedure executed by the item information input receiver, and this process starts when a telephone set connected to any of the operator terminals 20 receives a call from a customer.

The item information input receiver 13a determines whether an operator starts talking with a customer (step S801). If the talk starts (Yes at step S801), the item information input receiver 13a transmits and displays an item input screen 210 to/on the operator terminals 20 (step S802).

When the operator completes talking with the customer and checking customer information, the item information input receiver 13a determines whether a start item processing button 211 provided on the item input screen 210 (step S803) has been pressed. If the start item processing button 211 has been pressed, the item information input receiver 13a assigns the item ID (step S804). As one example of the assigning the item ID, a format of 13 digits that include 8 digits of date + 5 digits of serial number is adopted in the first embodiment. For example, ID of an item which is processed first on Jan. 19, 2004 is 2004011900001.

The assigned item ID, the operator ID of the operator in charge of the item, the customer ID of a customer who made an inquiry, the communication start time, and the item processing start time are displayed on the item input screen 210 (step S805). Further, if an item is being processed simultaneously, its item ID is displayed on the item input screen 210 (step S806).

If a plurality of items arise at one call, the item information input receiver 13a recognizes pressing-down of an input added item button 213 (Yes at step S807), and transmits and displays another item input screen 220 to the operator terminals 20 (step S808).

The process at steps S804 to S806 is repeated. That is, an additional item ID is assigned, and item IDs that are being processed simultaneously are displayed in the field simultaneously processing item ID of all the item input screens. In the example shown in FIG. 2, while the item with ID 2004011900001 is being processed, an item with ID 2004011900002 is added. Therefore, 2004011900002 is displayed in the field simultaneously processing item ID on item input screen 210.

The item information input receiver 13a determines whether communication with a customer has ended (step S809). If the communication has ended (Yes at step S809), the item information input receiver 13a displays the communication end time on all the currently displayed item input screens (step S810). When the operator inputs the inquiry contents and the response contents of the item and presses an end item processing button 212 (Yes at step S811), the item information input receiver 13a displays the item processing end time on the item input screen 210 (step S812).

The item information input receiver 13a determines whether the operator has completed the entire item processings underway (step S813). If all the item processings are complete (Yes at step S813), the item information input receiver 13a writes the item information, which has been input into the item input screens 210 and 220, into the item information database 12a (step S814), and ends the process.

The item information input receiver 13a transmits the item input screens to the operator terminals 20, receives input of the item information, and stores the received item information into the item information database 12a. Thus, the duration information in each dealing sequence in the dealing with customers can be integrally managed.

With reference to FIG. 1, the dealing duration estimating unit 13b estimates dealing duration of an item based on the duration information in each dealing sequence stored as the item information in the item information database 12a. Specifically, the dealing duration estimating unit 13b estimates dealing duration for each of the items including talking with customers and the inputting the item contents, based on the duration information in each dealing sequence (the sequences of communication start, item processing start, communication end, and item processing end shown in FIG. 4).

Figure 9:
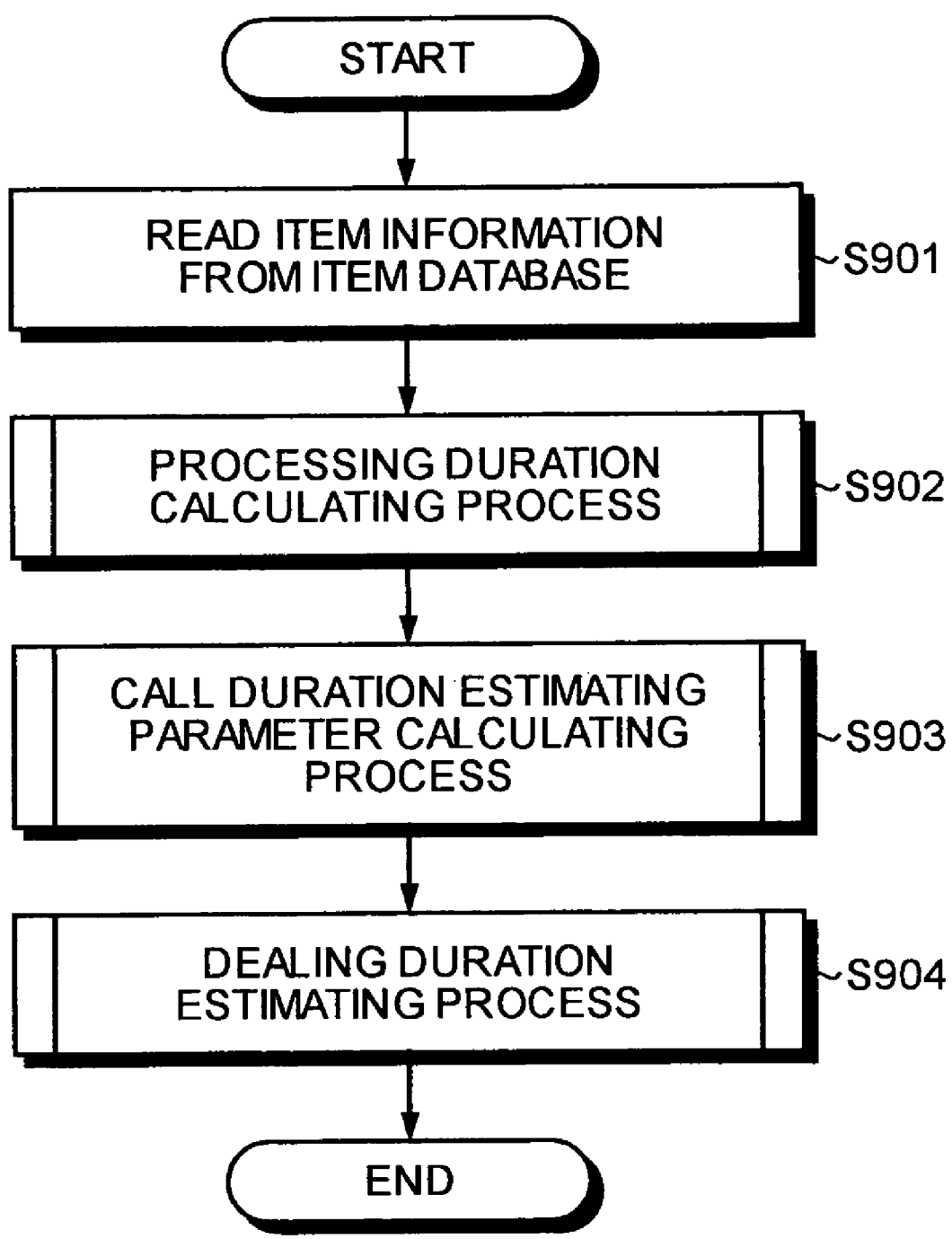
FIG. 9 is a flowchart of a basic control procedure executed by a dealing duration estimating unit.

FIG. 9 is a flowchart of the basic control procedure executed by the dealing duration estimating unit 13b. The process starts when an administrator instructs the work skill estimating device to start the work skill estimating process, through the administrator terminal 30. The dealing duration estimating unit 13b receives the start instruction of the work skill estimating process from the administrator terminal 30, and reads the item information about the items from the item information database 12a (step S901).

The dealing duration estimating unit 13b executes a processing duration calculating process (step S902) to calculate substantial dealing duration, call duration, and item processing duration based on the time data at each dealing sequence shown in FIG. 4.

The dealing duration estimating unit 13b executes a call duration estimating parameter calculating process (step S903) to calculate a parameter for estimating call duration required for one item. The call duration with a customer in the call center can be divided into fixed portion of the duration required for dealing which does not depend on item contents such as greetings and checking customer information, and variable portion of the duration required for dealing which depends on item contents such as a response to a question and solving an item. Further, limiting to when only one item is processed in one call, it is empirically found that the variable portion of the call duration is approximately proportional to the item processing duration, which is duration required for entering dealt contents. That is, the call duration roughly establishes an equation (1).

$$\text{Call duration} = \text{Fixed portion} + \text{Variable portion} \quad (1)$$
$$= \text{Fixed portion} + \text{Item processing duration} \times$$
$$\text{Ratio of variable portion}$$

Therefore, in the call duration estimating parameter calculating process, the two parameters including the fixed portion and the ratio of variable portion of the call duration are calculated.

Finally, the dealing duration estimating unit 13b executes the dealing duration estimating process (step S904) to calculate estimated dealing duration of each item using the two parameters fixed portion and ratio of variable portion of the call duration calculated in the call duration estimating parameter calculating process. The dealing duration estimating unit 13b writes the calculated results into the dealing duration database 12b.

Figure 10:
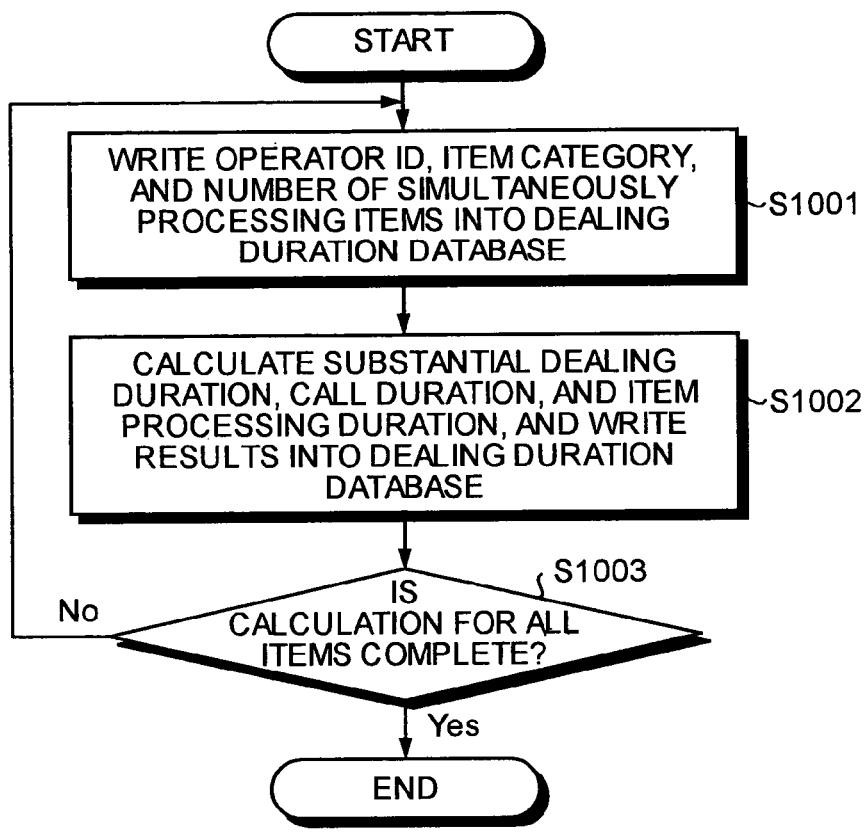
FIG. 10 is a flowchart of a process procedure for calculating a processing duration.

The processing duration calculating process executed by the dealing duration estimating unit 13b is explained next. FIG. 10 is a flowchart of a process procedure for calculating the processing duration. After reading the item information about the items from the item information database 12a, the dealing duration estimating unit 13b writes operator ID, item category, and the number of simultaneously processing items into the dealing duration database 12b (step S1001). The number of the simultaneously processing items is the number of item IDs described into the field of the simultaneously processing item ID in the item information database 12a. Data are written into each of the fields of operator ID, item category, and the number of simultaneously processing items on the first line in FIG. 5 based on the item information shown in FIG. 3.

The dealing duration estimating unit 13b calculates substantial dealing duration, call duration, and item processing duration, and writes the results into the dealing duration database 12b (step S1002). Specifically, as shown in FIG. 4, the substantial dealing duration is duration from communication start time to item processing end time. In the item information shown in FIG. 3, communication start time is 9:15:00, and item processing end time is 9:35:20. Therefore, the dealing duration estimating unit 13b calculates substantial dealing duration as 20 minutes and 20 seconds, and writes 00:20:20 as the substantial customer dealing duration in the dealing duration database 12b, for the item whose item ID is 200401190001 (see FIG. 5).

As shown in FIG. 4, the call duration is duration from communication start time to communication end time. In the item information shown in FIG. 3, communication start time is 9:15:00, and communication end time is 9:30:00. Therefore, the dealing duration estimating unit 13b calculates the call duration as 15 minutes and 0 seconds, and writes 00:15:00 as the call duration of the item whose item ID is 200401190001 (see FIG. 5). Similarly, the item processing duration is duration from item processing start time to item processing end time. In the item information shown in FIG. 3, the item processing start time is 9:16:30, and the item processing end time is 9:35:20. Therefore, the dealing duration estimating unit 13b calculates the item processing duration as 18 minutes and 50 seconds, and writes 00:18:50 as the item processing duration in the item whose item ID is 200401190001 (see FIG. 5).

The dealing duration estimating unit 13b executes the process at steps S1001 and S1002 for all the items stored in the item information database 12a, and when after completing the process for all the items (Yes at step S1003), ends the processing duration calculating process.

Figure 11:
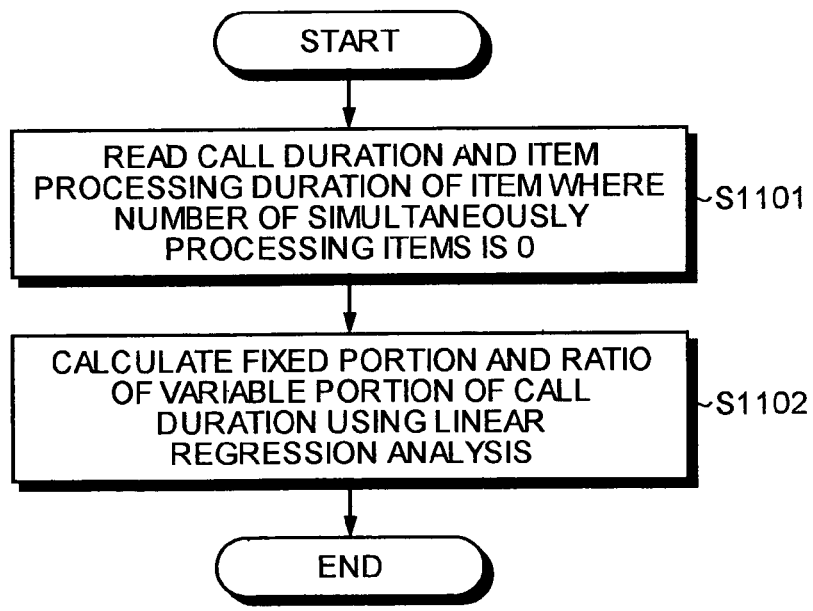
FIG. 11 is a flowchart of a process procedure for calculating a call duration estimating parameter.

The call duration estimating parameter calculating process in the dealing duration estimating unit 13b is explained next. FIG. 11 is a flowchart of a process procedure for calculating the call duration estimating parameter. The dealing duration estimating unit 13b receives end of the processing duration estimating process, and reads data of call duration and item processing duration of the item where simultaneously processing item is 0 in the item information written into the dealing duration database 12b (step S1101).

The dealing duration estimating unit 13b calculates fixed portion and ratio of variable portion of call duration, which are the call duration estimating parameters, using call duration and item processing duration (step S1102). In the first embodiment, the parameters are calculated using a statistical analysis method known as a linear regression analysis.

Figure 12:
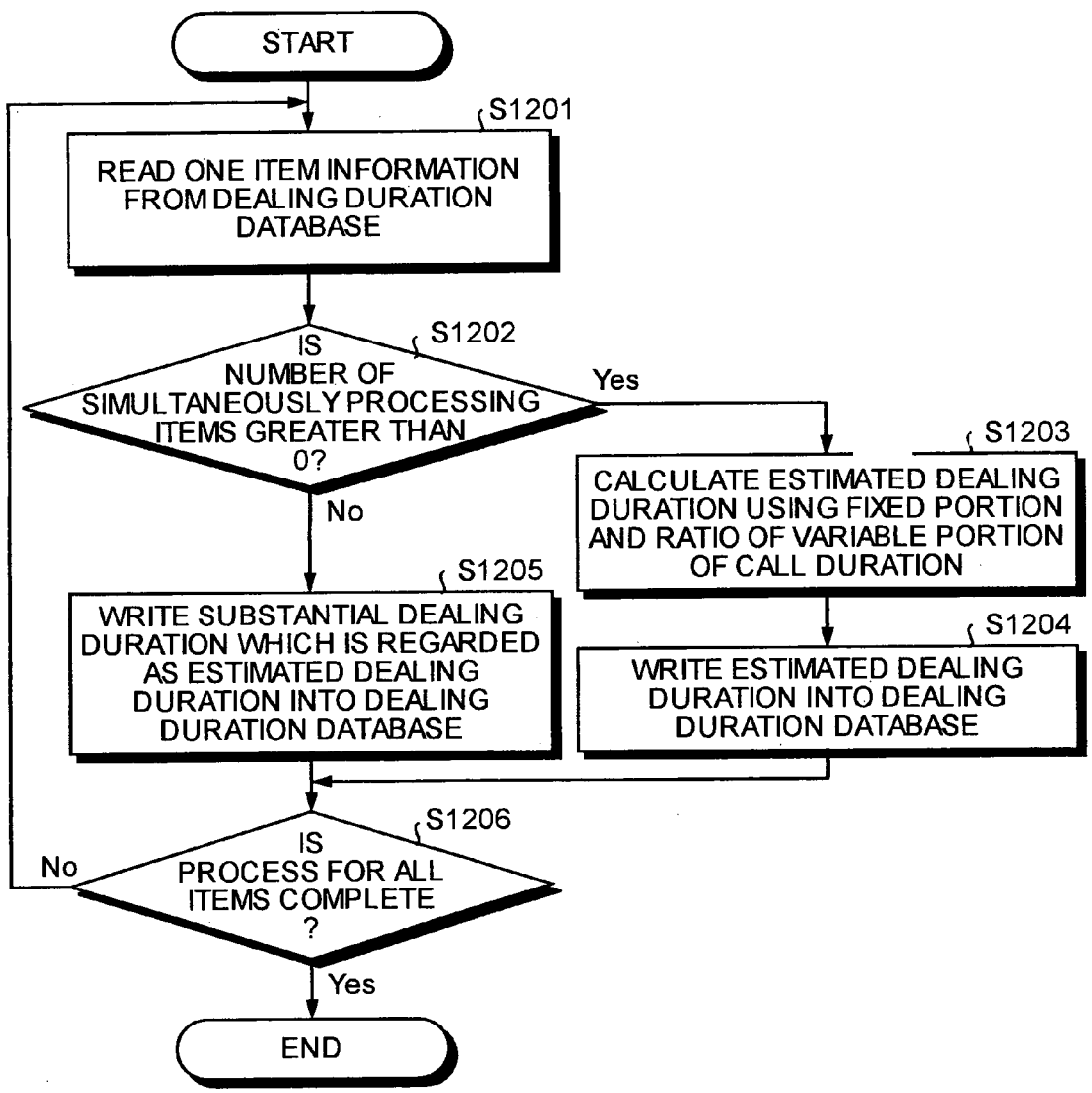
FIG. 12 is a flowchart of a process procedure for estimating a dealing duration.

The dealing duration estimating process executed by the dealing duration estimating unit 13b is explained next. FIG. 12 is a flowchart of a process procedure for estimating the dealing duration. The dealing duration estimating unit 13b receives end of the call duration estimating parameter calculating process, and reads the item information from the dealing duration database 12b (step S1201).

The dealing duration estimating unit 13b determines whether the number of simultaneously processing items is greater than 0 (step S1202). If the number of simultaneously processing items is greater than 0 (Yes at step S1202), the dealing duration estimating unit 13b calculates estimated dealing duration using the call duration estimating parameters fixed portion and ratio of variable portion calculated at the call duration estimating parameter calculating process. For example, the estimated dealing duration can be calculated using the equation 2.

$$\begin{aligned}\text{Estimated dealing duration} = {} & \text{Estimated call duration} + \quad (2)\\ & \text{Item processing duration}\\ = {} & \text{Fixed portion of call duration} +\\ & \text{Item processing duration} \times\\ & \text{Ratio of variable portion} +\\ & \text{Item processing duration}\\ = {} & \text{Fixed portion of call duration} +\\ & \text{Item processing duration} \times\\ & (1 + \text{ratio of variable portion})\end{aligned}$$

For example, if the fixed portion of the call duration calculated at the call duration estimating parameter calculating process is 5 minutes and the ratio of variable portion is 0.5, the estimated dealing duration of the item ID 200401190001 is calculated as follows according to the equation 2 because the number of simultaneously processing items is 1:

Estimated dealing duration=5 minutes+18 minutes and 50 seconds×(1+0.5)=33 minutes and 15 seconds Similarly, the number of simultaneously processing items is 1, and hence, the estimated dealing duration of the item ID 200401190002 is calculated according to the second formula as follows:

Estimated dealing duration=5 minutes+10 minutes
and 40 seconds×(1+0.5)=21 minutes The estimated dealing duration calculated in such a manner is written into the dealing duration database 12*b* (step S1204).

On the other hand, if the number of simultaneously processing items is 0, the substantial dealing duration, which is regarded as the estimated dealing duration, is written into the dealing duration database 12*b* (step S1205). For example, the number of simultaneously processing items is 0, and hence, the substantial dealing duration is regarded directly as the estimated dealing duration, so that the estimated dealing duration of the item ID 200401190003 is 00:17:30.

The dealing duration estimating unit 13*b* executes the process at steps S1201 to S1205 on all the items stored in the dealing duration database 12*b*, and when the process for all the items is complete (Yes at step S1206), the dealing duration estimating unit 13*b* ends the dealing duration estimating process.

When a plurality of items are dealt with at one call, the dealing duration of each item is estimated based on the call duration and the item processing duration at the time when one item is dealt with at one call, and the item processing duration of each item at the time when the items are dealt with at one call. Therefore, even when a plurality of items (questions and troubles) are dealt with at one call from a customer, the call duration at the time when individual items are dealt with in individual calls, respectively, can be estimated. As a result, the dealing duration of each item can be obtained accurately.

With reference to FIG. 1, the work skill estimating unit 13*c* calculates operators' work skills in work tasks based on the estimated dealing duration of the items estimated by the dealing duration estimating unit 13*b*.

Figure 13:
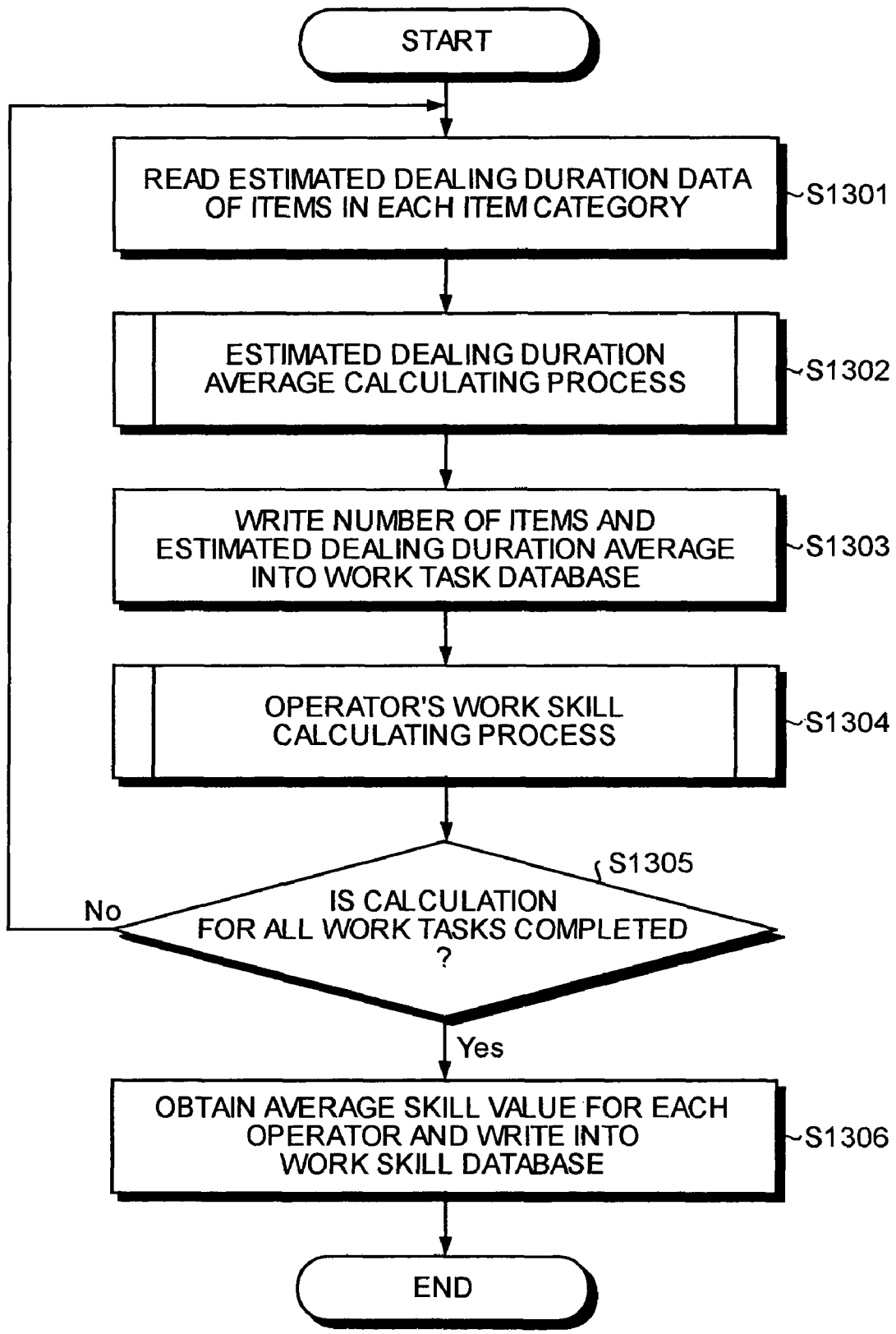
FIG. 13 is a flowchart of a process procedure executed by a work skill estimating unit.

FIG. 13 is a flowchart of a processing procedure executed by the work skill estimating unit 13*c*. After the dealing duration estimating unit 13*b* estimates the estimated dealing duration, the work skill estimating unit 13*c* reads the estimated dealing duration data of the items in each item category from the dealing duration database 12*b* (step S1301). The process is explained with updating of member information as an example.

Figure 14:
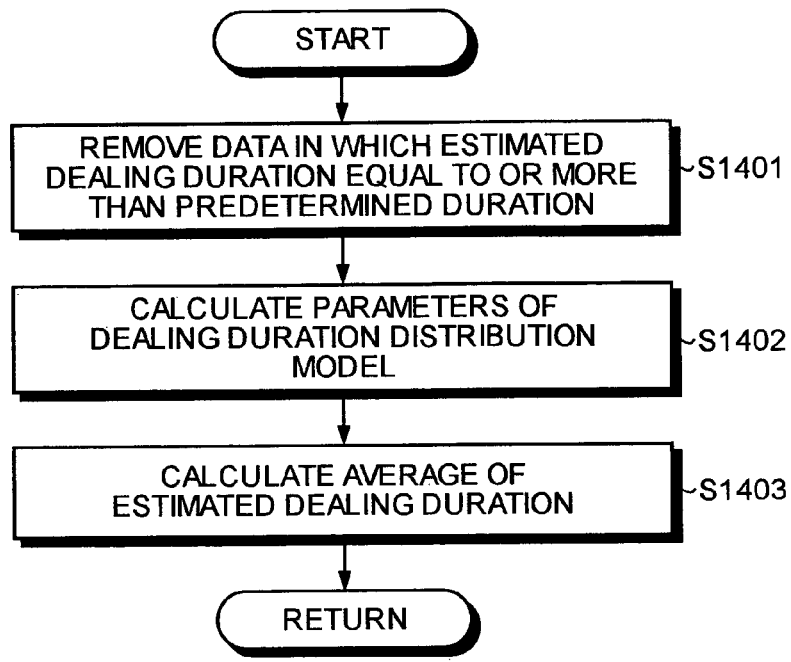
FIG. 14 is a flowchart of a process procedure for calculating an average of estimated dealing duration.

The work skill estimating unit 13*c* calculates an estimated dealing duration average of all the operators (step S1302). FIG. 14 is a flowchart of a process procedure for calculating the estimated dealing duration average. Since work task corresponds to item category, the process is executed using the estimated dealing duration data of all the items belonging to updating of member information.

First, an item whose estimated dealing duration is equal to or more than predetermined duration is removed and the remaining data is used for the process of estimating the dealing duration distribution model (step S1401). As an example, the predetermined duration may be three times the estimated dealing duration of all the items.

Figure 16:
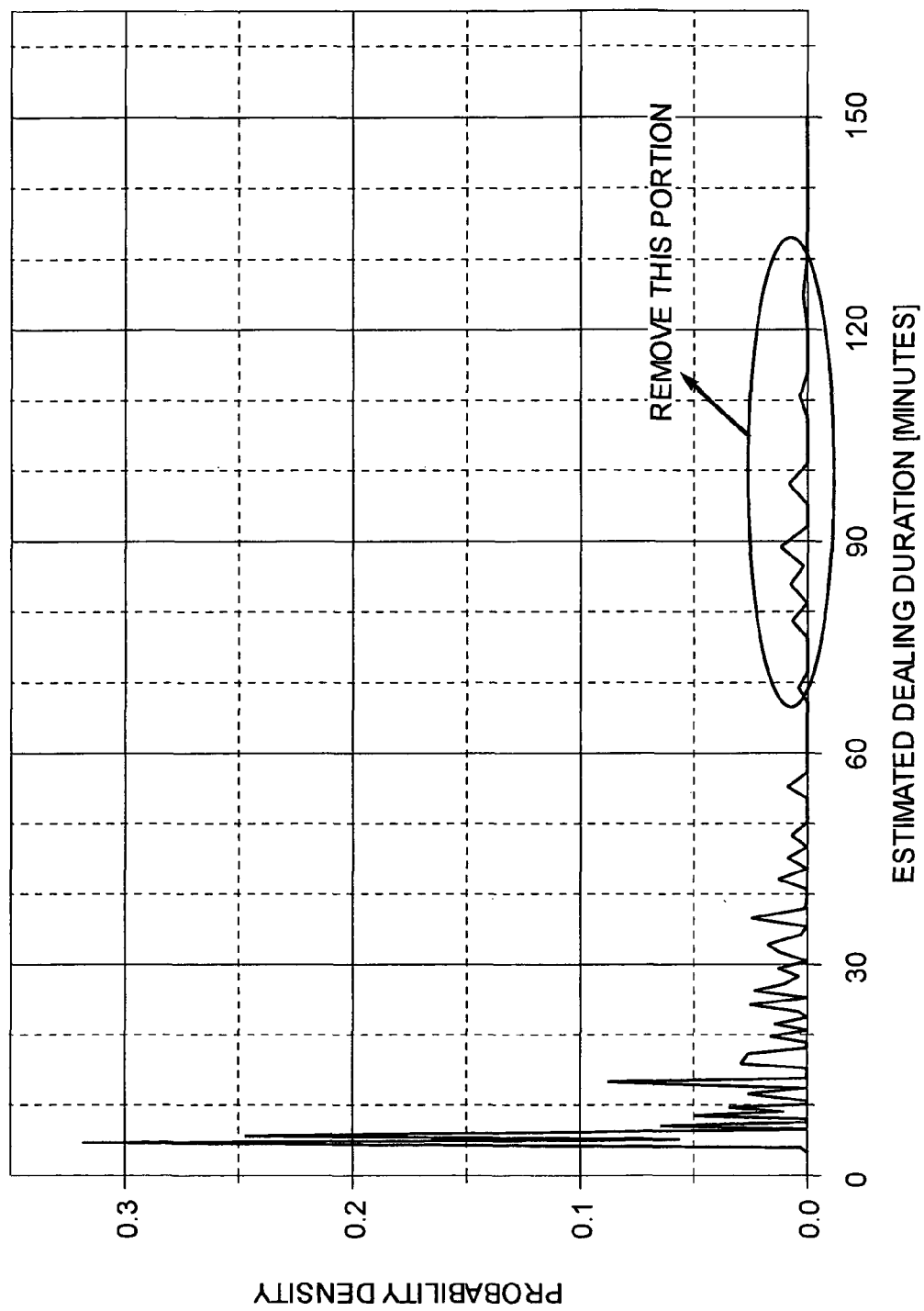
FIG. 16 illustrates removal of estimated dealing duration data.

The estimated dealing duration to be removed is expressed clearly using FIG. 16. FIG. 16 is a graph for explaining the removal of estimated dealing duration data that is equal to or more than the predetermined time. In FIG. 16, a horizontal axis represents the estimated dealing duration, and a vertical axis represents a ratio of the number of items with the estimated dealing duration in a constant section. When the average of the estimated dealing duration is 20 minutes, the condition for removal is equal to or more than 60 minutes. An item corresponding to a portion included in an oval in the graph is removed.

Then, the work skill estimating unit 13*c* calculates parameters of the dealing duration distribution model (step S1402). Specifically, in the call center, it is found by experience that the distribution of the dealing duration of the same kind of work tasks conforms to lognormal distribution. The lognormal distribution can be expressed by the equation 3:

$$f(\chi) = \frac{1}{\sqrt{2\pi} \cdot \sigma \chi} \exp\left(\frac{-(\log \chi - \mu)^2}{2\sigma^2}\right) \quad (3)$$

where χ Estimated dealing duration, and f(χ) is Probability density

The parameters of the dealing duration distribution model are μ and σ. Therefore, these parameters are obtained using the estimated dealing duration data that is obtained at step S1401. For example, the parameters can be calculated by using a method known as a nonlinear least-squares method.

Figure 17:
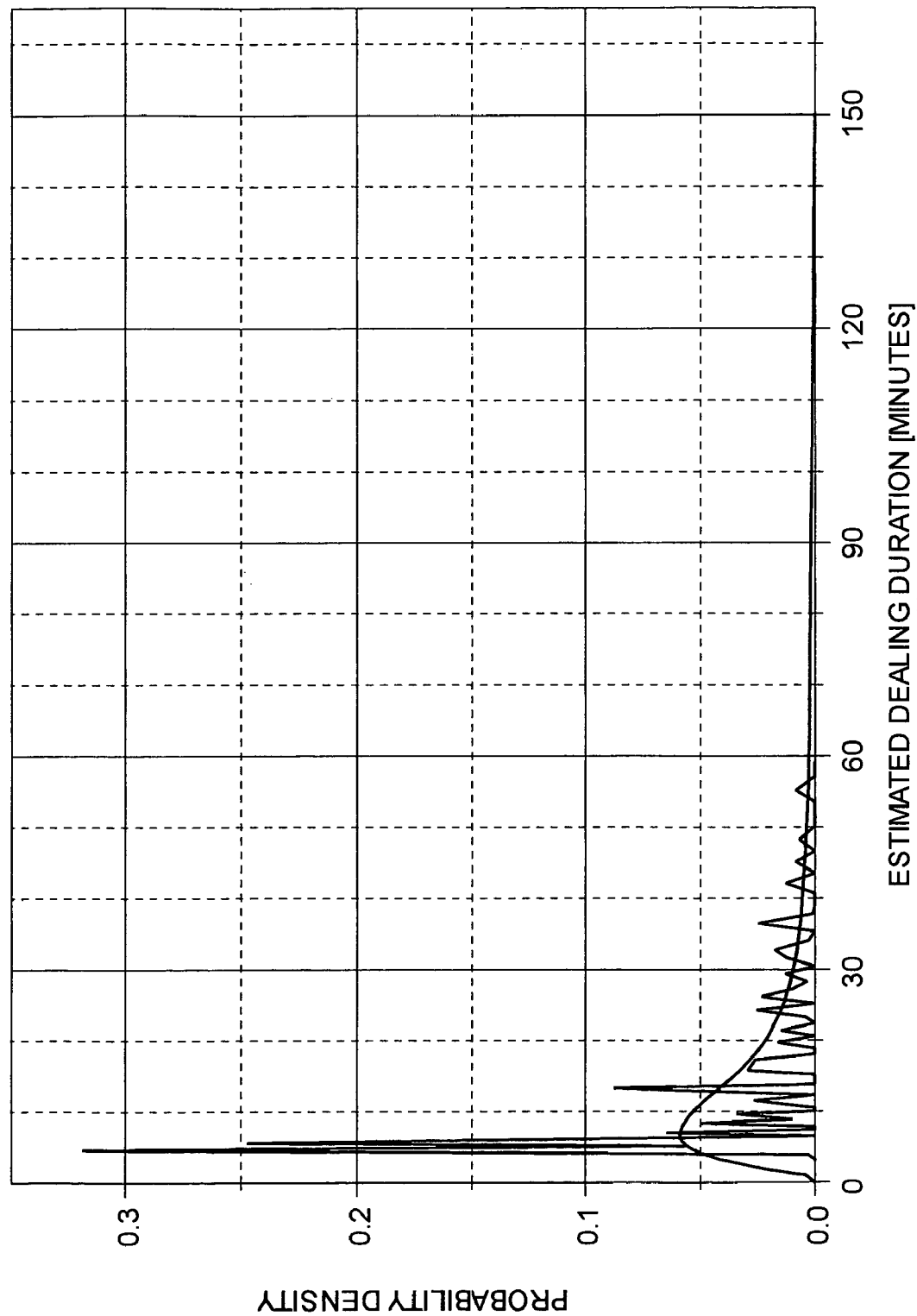
FIG. 17 illustrates a dealing duration distribution model.

The work skill estimating unit 13*c* calculates the estimated dealing duration average (step S1403), and writes the number of items belonging to the updating of member information and the estimated dealing duration average into the work task database 12*c* (step S1303 in FIG. 13). Specifically, the work skill estimating unit 13*c* obtains the dealing duration distribution model (see FIG. 17) using the parameters (μ=2.5, σ=0) calculated at step S1402, and calculates the dealing duration distribution model as the estimated dealing duration average. Since the dealing duration distribution model is expressed by the lognormal distribution, the estimated dealing duration average E can be expressed by the equation 4 by using the parameters of the dealing duration distribution model.

$$E = \exp\left(\mu + \frac{1}{2}\sigma^2\right) \quad (4)$$

For example, the estimated dealing duration average in the work task updating of member information is calculated as about 19.88 minutes by substituting μ=2.5 and σ=0.7 into the equation 4.

Figure 15:
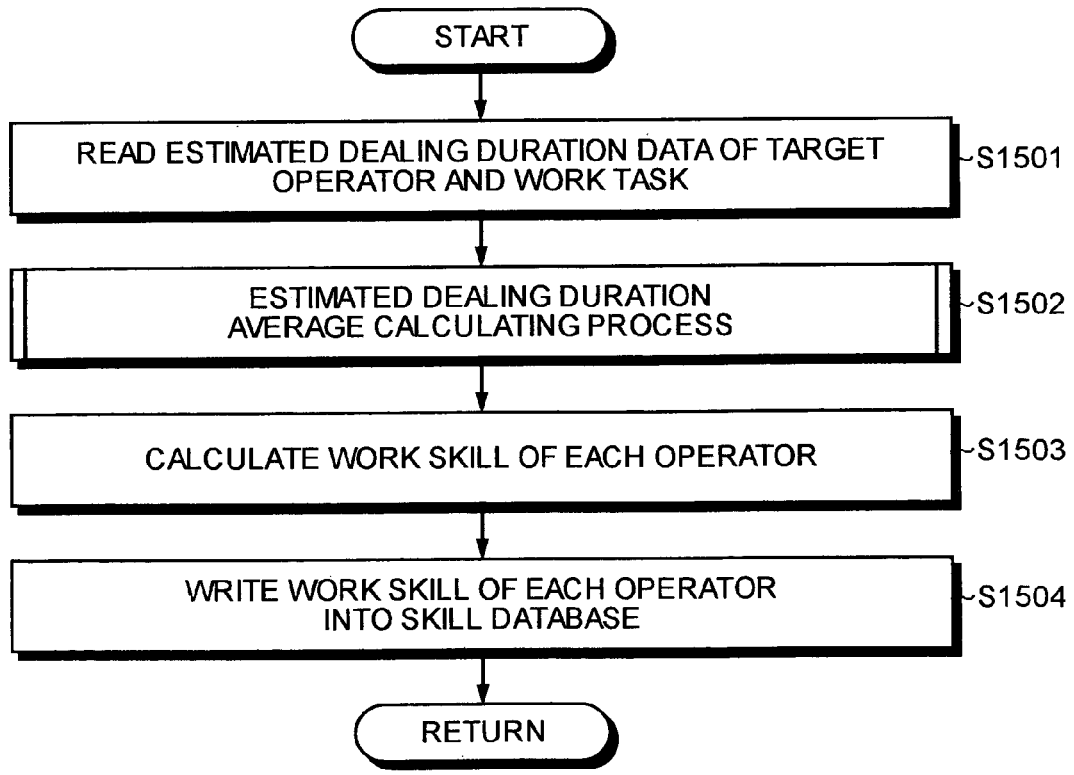
FIG. 15 is a flowchart of a process procedure for calculating an operator's work skill.

Next, the work skill estimating unit 13*c* calculates the work skills of the individual operators (step S1304). FIG. 15 is a flowchart of a process procedure for calculating the operator's work skill. This process is executed for individual operators who execute the updating of member information to be currently processed. First, the work skill estimating unit 13*c* reads the estimated dealing duration data of each operator from the dealing duration database 12*b* using the updating of member information as a key (step S1501).

The work skill estimating unit 13*c* calculates the average of the estimated dealing duration of each operator (step S1502). The process for calculating the average of the estimated dealing duration of each operator can be executed by the similar method to that shown in FIG. 14.

The work skill estimating unit 13 calculates the work skill of each operator (step S1503), and writes the calculated work skill of each operator into the work skill database 12*d* (step S1504). As an example, the work skill of each operator is calculated according to the equation 5 using the estimated dealing duration average of all the operators calculated at step S1302 and the estimated dealing duration average of each operator.

$$\text{Operator's work skill} = \\ 100 \times (\text{estimated dealing duration average of all the operators}/ \\ (\text{estimated dealing duration average of each operator}) \quad (5)$$

For example, if the estimated dealing duration average of the work task updating of member information done by the operator having operator ID OP00001 is 22 minutes, the estimated dealing duration average of all the operator in the work task updating of member information is calculated as 19.88 minutes. Therefore, these values are substituted into the equation 5, so that the work skill of the operator is calculated as 90.

As for the updating of member information to be currently processed, the process at steps S1501 to S1504 are executed on all the operators, and when the process on all the operators is completed, the operator's work skill calculating process ends.

The process at steps S1301 to S1305 is repeated for work tasks whose work skills are not yet calculated, except for the item category of the updating of member information (No at step S1305).

If the work skills in all the work tasks are calculated (Yes at step S1305), the work skill estimating unit 13c calculates the work skill average of each operator. For example, in FIG. 7, in the work skills in each work task of the operator ID OP00001, the solving of Internet trouble is 55, the response to question about the Internet is 67, the solving of software trouble is 80, the response to question about software is 85, the solving of hardware trouble is 60, the response to question about hardware is 68, and the updating of member information is 90. Therefore, the average skill value becomes 72.1 which is obtained as an average of the above values. Finally, the work skill estimating unit 13c writes the calculated average skill value into the work skill database 12d (step S1306), and ends the process.

The work skill estimating unit 13c removes a certain item whose dealing duration is equal to or more than the predetermined duration from the items whose dealing duration is estimated. The work skill estimating unit 13c estimates the dealing duration distribution model based on the lognormal distribution to calculate the average of the dealing duration, and estimates the operator's work skill based on the calculated average of the dealing duration. Therefore, the work skill estimating unit 13c removes an influence of an item whose dealing duration becomes longer, due to a factor not caused by a dealing work for a customer, to calculate the average obtained by interpolating the dealing duration of the removed item and estimates the work skill. Consequently, the operator's work skill can be estimated more accurately.

With reference to FIG. 1, the skill map creating unit 13d creates a skill map by which the work skills of all the operators can be comprehended based on the work skills estimated by the work skill estimating unit 13c.

Figure 18:
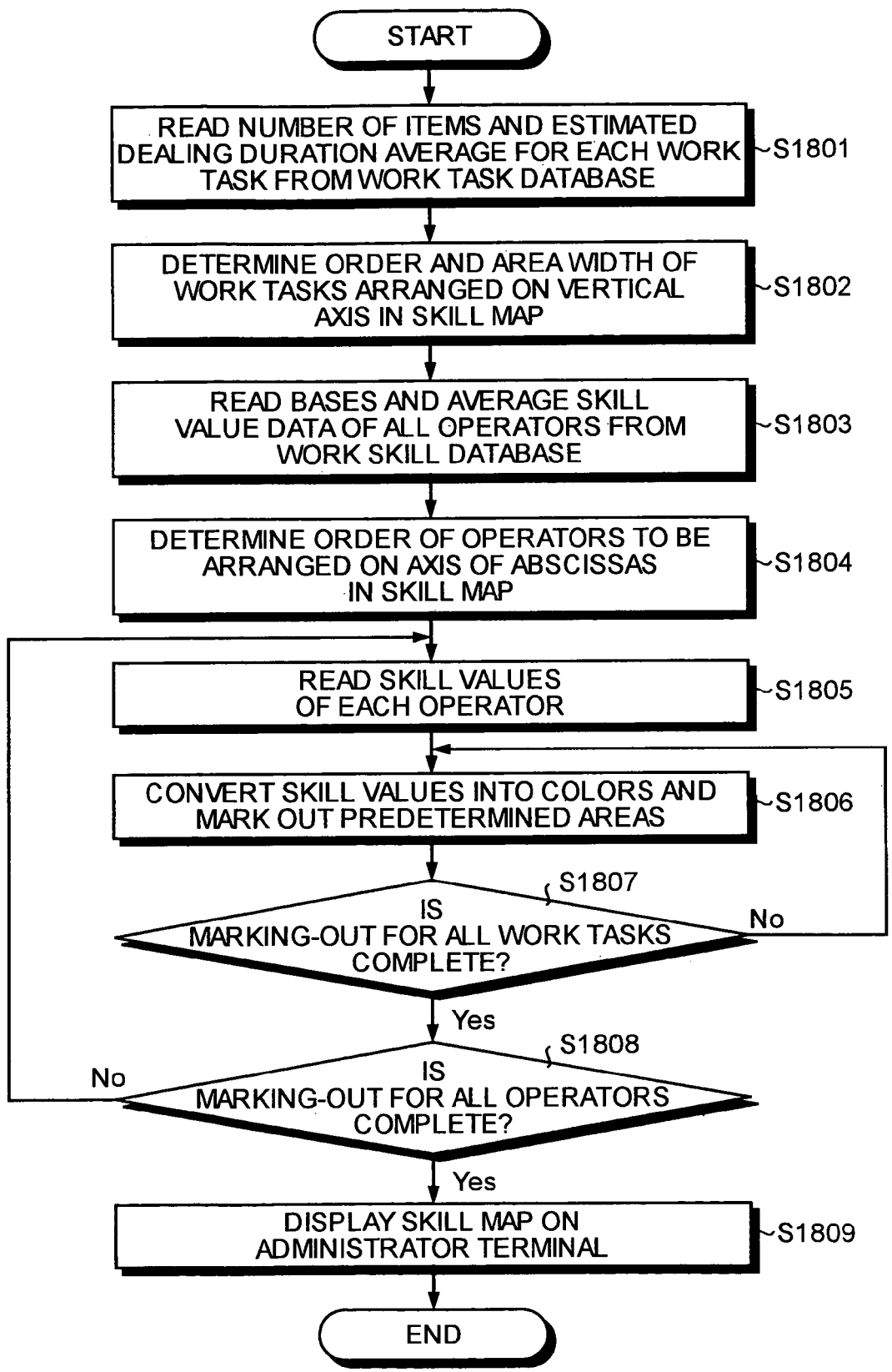
FIG. 18 is a flowchart of a process procedure executed by a skill map creating unit.
Figure 19:
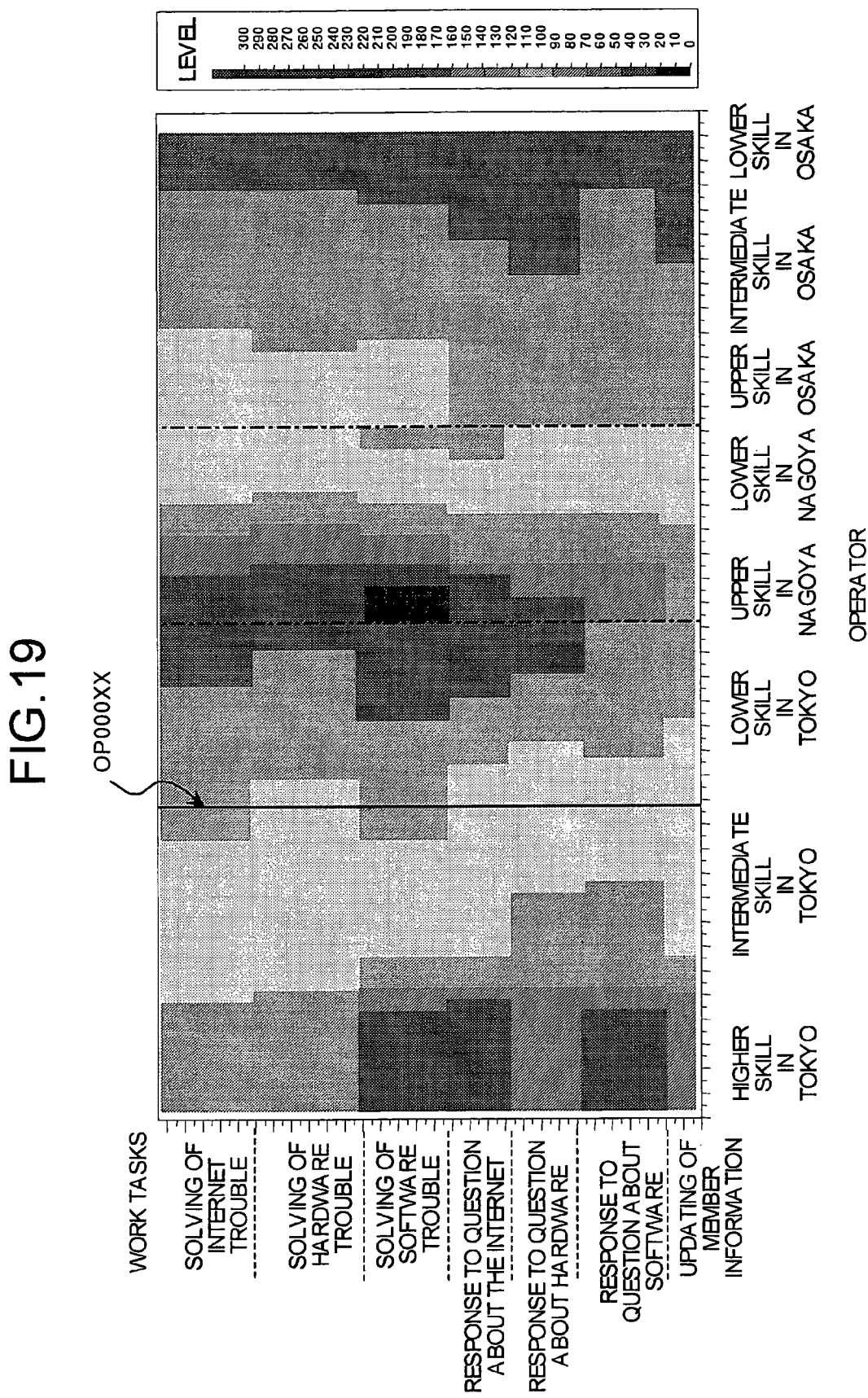
FIG. 19 illustrates one example of a skill map created by the skill map creating unit.

FIG. 18 is a flowchart of the process procedure executed by the skill map creating unit. FIG. 19 illustrates one example of the skill map created by the skill map creating unit. With reference to the skill map in FIG. 19, the process is explained below.

This process starts when the skill map creating unit 13d accepts an instruction for creating a skill map from the administrator terminal 30 after the process in the work skill estimating unit 13c ends. The skill map creating unit 13d reads the number of items and the estimated dealing duration average for each of the work tasks from the work task database 12c (step S1801).

The skill map creating unit 13d determines an order and an area width of the work tasks arranged on the vertical axis (step S1802). For example, as to the order of the work tasks, the work tasks having larger estimated dealing duration average are arranged on an upper portion. The area width is allocated in proportion to the number of the same kinds of work tasks. The vertical axis in the skill map in FIG. 19 represents arranged results based on the work task data in the work task database 12c in FIG. 6, and areas sandwiched between dotted lines are areas for the respective work tasks.

The skill map creating unit 13d reads bases and average skill value data of all the operators from the work skill database 12d (step S1803), and determines an order of the operators to be arranged on a horizontal axis in the skill map (step S1804). For example, the order is such that the operators are sorted by base and operators having higher average skill in each base are arranged on a left portion. With this arrangement, as represented on the horizontal axis in the skill map in FIG. 19, the operators can be arranged in the order of decreasing skill according to the bases.

The skill map creating unit 13d reads the skill values of an operator from the work skill database 12d (step S1805). The skill map creating unit 13d converts the skill values read into colors, and marks out predetermined areas on the skill map (step S1806). For example, in the example of the skill map shown in FIG. 19, when the task skill values are converted into colors, blue is set for a lower skill value, grey is set for a skill value of about 100, namely, average level, and red is set for a higher skill value.

When the marking-out for all the work tasks is complete (Yes at step S1807), the skill map creating unit 13d reads the next operator's skill values, and executes the marking-out process. When the marking-out process for all the operators is complete (Yes step S1808), the skill map creating unit 13d displays the created skill map on the administrator terminal 30 and ends the process (step S1809).

On the skill map created in such a manner, an area for preferential training can be displayed. Specifically, a difference in the work skill value between the operator having the highest work skill and the operator having the lowest work skill is obtained for each work task, and an area of the work task with the largest difference and where the skill value is equal to or less than a certain value (for example, 70) is blinked.

For example, in the skill map of FIG. 19, the work task "solving of software trouble" has the largest skill difference. Therefore, the "solving of trouble" area on the horizontal axis, where the skill value is equal to or less than 70, is blinked as the area for preferential training. Thus, the administrator understands that if an operator in the blinking area is trained in the solving of software trouble, best results can be obtained from that operator.

According to the work skill estimating device 10 in the first embodiment, the work skills of all the operators can be comprehended, but originally, individual operators are arranged on the horizontal axis on the skill map of FIG. 19. Therefore, for example, if the administrator wants to refer to detailed information about operators with intermediate skill in Tokyo, that portion is marked by a user interface. As a result, the administrator can refer to the information about individual operators with intermediate skill in Tokyo such as OP 00XX.

According to the work skill estimating device 10 in the first embodiment, the work skills of all the appropriate operators can be shown with respect to the work tasks in the skill map. This makes it possible to understand the operator's work skills exhaustively and easily. Further, the item processing duration is a basis of the estimation of the operator's work skills, and when an operator processes a plurality of items in one call, the processing duration of each item is estimated. Therefore, more accurate work skills can be estimated.

The work skill estimating device and the work skill estimating method explained in the first embodiment can be realized by causing a computer system such as a personal computer and a work station to execute a prepared program. Therefore, the computer system that executes a work skill estimating program having the same function as the work skill estimating device (work skill estimating method) explained in the first embodiment, is explained below as a second embodiment.

Figure 20:
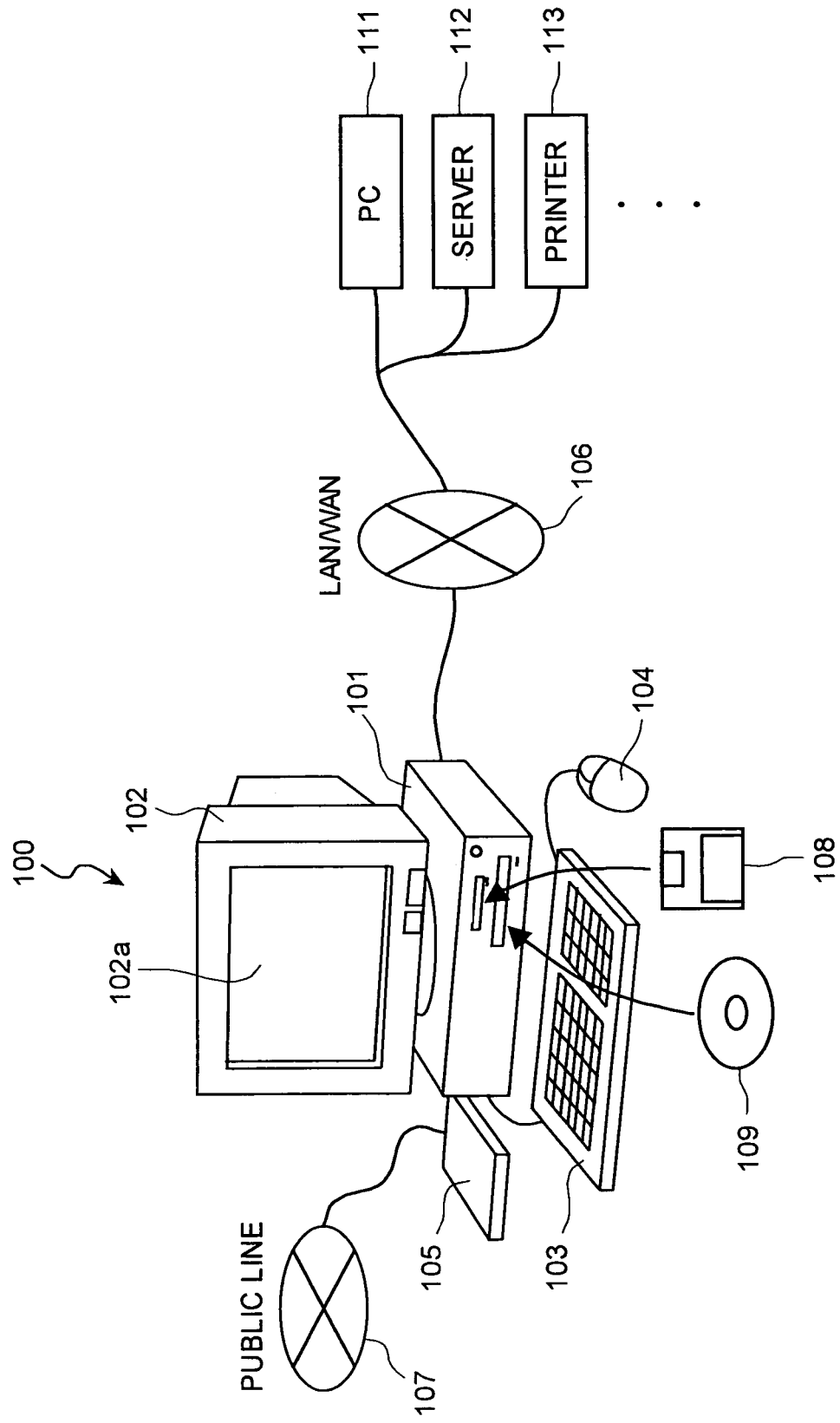
FIG. 20 illustrates a constitution of a computer system according to a second embodiment of the present invention.
Figure 21:
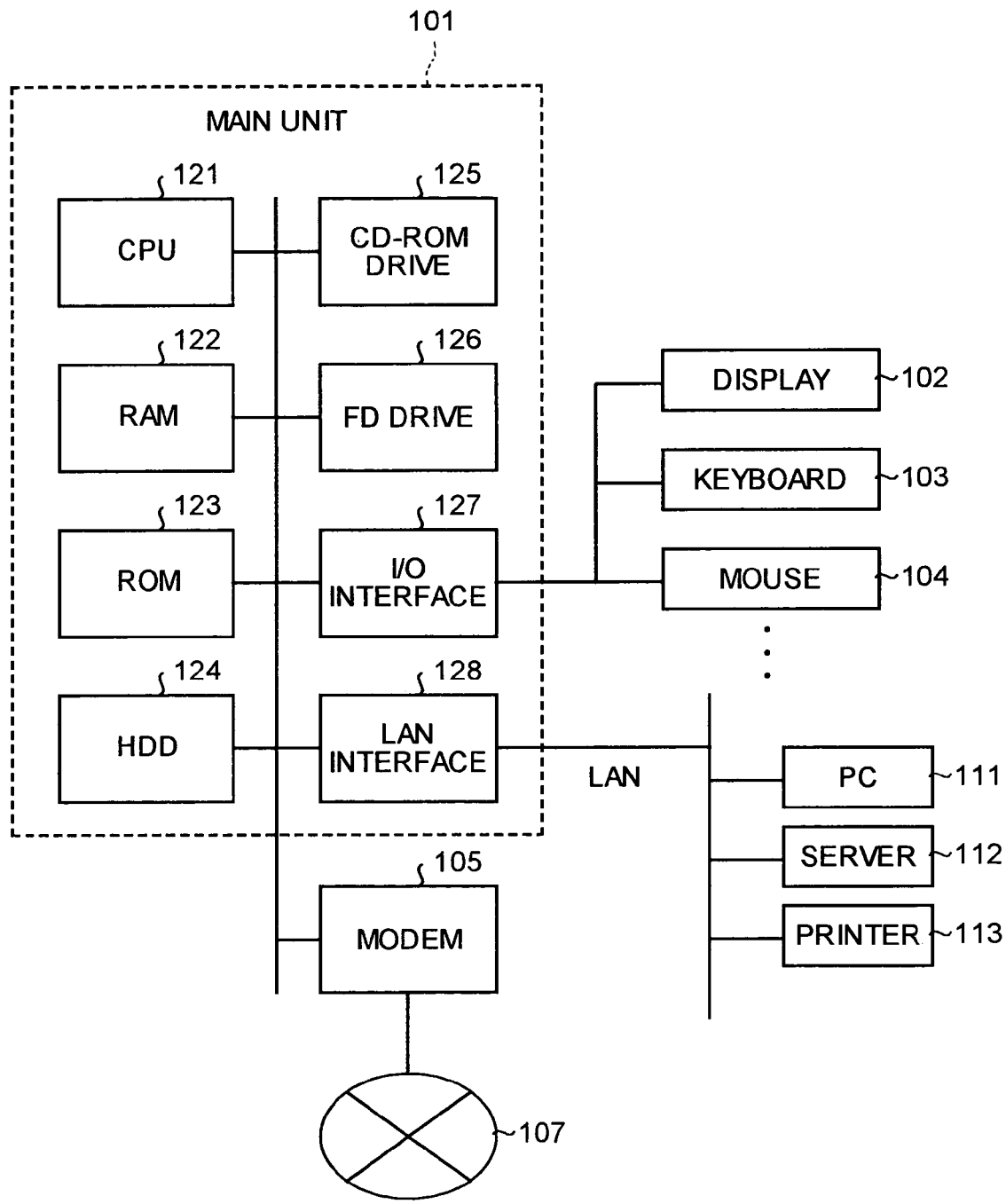
FIG. 21 illustrates a configuration of a main unit in the computer system shown in FIG. 20.

FIG. 20 is a computer system according to the second embodiment, and FIG. 21 illustrates a configuration of a main unit in the computer system. As shown in FIG. 20, a computer system 100 includes a main unit 101, a display 102, a keyboard 103, and a mouse 104. The display 102 displays information such as an image on a display screen 102a based on an instruction from the main unit 101. The keyboard 103 is used for inputting various pieces of information into the computer system 100. The mouse 104 is used for specifying an arbitrary position on the display screen 102a of the display 102.

The main unit 101 in the computer system 100 includes a central processing unit (CPU) 121, a random access memory (RAM) 122, a read only memory (ROM) 123, a hard disc drive (HDD) 124, a CD-ROM drive 125 for accessing a CD-ROM 109, an FD drive 126 for accessing a flexible disk (FD) 108, an I/O interface 127 that connects the display 102, the keyboard 103, and the mouse 104, and a LAN interface 128 that connects to a local area network or a wide area network (LAN/WAN) 106.

The computer system 100 is connected to a modem 105 that connects the computer system 100 with a public line 107 such as the Internet, and is connected to another computer system (PC) 111, a server 112, and a printer 113 via the LAN interface 128 and LAN/WAN 106.

The computer system 100 reads and executes the work skill estimating program recorded in a predetermined recording medium, to realize the work skill estimating device and the (work skill estimating method). The predetermined recording medium includes portable physical media such as the flexible disk (FD) 108, the CD-ROM 109, a magneto optical (MO) disk, a digital versatile disk (DVD), a magneto-optical disk, and an IC card. Further, the recording medium includes fixed physical media such as the hard disc drive (HDD) 124, the RAM 122, and the ROM 123 which are provided internally or external to the computer system 100. That is, the predetermined recording medium includes every recording medium having the work skill estimating program readable by the computer system 100 recorded therein.

That is, the work skill estimating program is computer-readable and is recorded into the recording medium such as the portable physical medium and the fixed physical medium. The computer system 100 reads and executes the work skill estimating program from the recording medium, to realize the work skill estimating device and the work skill estimating method. The work skill estimating program is not limited to the execution by the computer system 100, and the present invention can be similarly applied to when another computer system 111 or the server 112 executes the work skill estimating program or when they cooperate to execute the work skill estimating program.

The first and the second embodiments are explained above, but the present invention may be carried out in various different embodiments other than the above embodiments within a range of technical idea described in the appended claims.

The first embodiment measures the item processing duration, that is, from the pressing-down of the start item processing button 211 to the pressing-down of the end item processing button 212, in a state that all the item input screens are active. However, the present invention is not limited thereto, and the item processing duration may be measured in a state that only that item input screen, which accepts input of the item contents, is active.

In the processes explained in the embodiments, all or some of the explained processes that are executed automatically may be executed manually, or all or some of the explained processes executed manually may be executed automatically by any well-known method. The processing procedure, the control procedure, the specific names, and information including various data and parameters described in the specification or shown in the drawings may be arbitrarily changed except for specified cases.

The components of the devices shown are functionally conceptual, and they are not always constituted physically as shown in the drawings. That is, the specific modes of dispersion and integration of the respective devices are not limited to those shown in the drawings, and all or some of the devices can be dispersed or integrated functionally or physically in an arbitrary unit according to various loads or use conditions. Further, all or some of the processing functions executed in the devices may be realized by a CPU and a program to be analyzed/executed by the CPU, or realized as hardware by a wired logic.

The work skill estimating device according to the present invention manages the work skills of the operators accurately and exhaustively.

Moreover, even when a plurality of the items (questions and troubles) are dealt with in one call from a customer, the work skill estimating device obtains the dealing duration of individual items accurately.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A work skill estimating device comprising:
   an item information receiving unit to receive a call duration and an item processing duration for each of a plurality of items of each of a plurality of dealing sequences for a customer call, the call duration being spent for communication with a customer, the item processing duration being required for inputting dealing contents during the customer call, the customer call including said plurality of items, and each of the dealing sequences including a sequence from communication start, item processing start, communication end, and to item processing end per said each of the items;
   a dealing duration estimating unit to estimate said call duration of said each of the items on an assumption that said each of the items within the customer call is independently dealt with in one customer call, based on said call duration and said item processing duration in a case where said each item is dealt with in said one customer call, and the item processing duration of each of the items, and estimate a dealing duration of each of the items by adding the estimated call duration to the item processing duration;
a work skill estimating unit to estimate an operator's work skill based on the estimated dealing duration; and
a skill map creating unit to create a skill map representing the estimated operator's work skill.

2. The work skill estimating device according to claim 1, wherein
the work skill estimating unit removes an item, whose dealing duration is equal to or more than a specified duration, from the items whose dealing duration is estimated, and thereafter, the work skill estimating unit estimates the operator's work skill based on an average of the dealing duration that is calculated by estimating a dealing duration distribution model based on lognormal distribution.

3. A method for estimating work skill of operators, comprising:
receiving a call duration and an item processing duration for each of a plurality of items of each of a plurality of dealing sequences for a customer call, the call duration being spent for communication with a customer, the item processing duration being required for inputting dealing contents during the customer call, the customer call including said plurality of items, and each of the dealing sequences including a sequence from communication start, item processing start, communication end, and to item processing end per said each of the items;
estimating said call duration of said each of the items on an assumption that said each of the items within the customer call is independently dealt with in one customer call, based on said call duration and said item processing duration in a case where said each item is dealt with in said one customer call, and the item processing duration of each of the items, and estimate a dealing duration of each of the items by adding the estimated call duration to the item processing duration;
estimating an operator's work skill based on the estimated dealing duration; and
creating a skill map representing the estimated operator's work skill.

4. A non-transitory computer-readable recording medium that records therein a computer program that includes instructions which, when executed, cause a computer to execute:
receiving a call duration and an item processing duration for each of a plurality of items of each of a plurality of dealing sequences for a customer call, the call duration being spent for communication with a customer, the item processing duration being required for inputting dealing contents during the customer call, the customer call including said plurality of items, and each of the dealing sequences including a sequence from communication start, item processing start, communication end, and to item processing end per said each of the items;
estimating said call duration of said each of the items on an assumption that said each of the items within the customer call is independently dealt with in one customer call, based on said call duration and said item processing duration in a case where said each item is dealt with in said one customer call, and the item processing duration of each of the items, and estimate a dealing duration of each of the items by adding the estimated call duration to the item processing duration;
estimating an operator's work skill based on the estimated dealing duration;
creating a skill map representing the estimated operator's work skill; and
outputting the skill map.

* * * * *